United States Patent [19]
Ward

[11] Patent Number: 6,030,594
[45] Date of Patent: Feb. 29, 2000

[54] CATALYST

[75] Inventor: Andrew Mark Ward, Cleveland, United Kingdom

[73] Assignee: Imperial Chemical Industries PLC, United Kingdom

[21] Appl. No.: 09/239,064

[22] Filed: Jan. 27, 1999

[30] Foreign Application Priority Data

Jan. 27, 1998 [GB] United Kingdom ............... 9801564

[51] Int. Cl.$^7$ ........................... C01B 21/26; B01J 21/04; B01J 8/02; B01D 50/00; F28D 8/04
[52] U.S. Cl. ...................... 423/403; 423/404; 502/439; 502/527.16; 502/527.23; 422/173; 422/177; 422/181; 422/198; 422/211
[58] Field of Search ................... 423/403, 404; 502/527.16, 439, 326, 527.23; 422/177, 173, 198, 181, 211

[56] References Cited

U.S. PATENT DOCUMENTS

| | | | |
|---|---|---|---|
| 5,017,542 | 5/1991 | Martan et al. ................ | 502/209 |
| 5,401,483 | 3/1995 | Ostroff .................... | 423/376 |
| 5,599,509 | 2/1997 | Toyao et al. ............... | 422/180 |

OTHER PUBLICATIONS

"Catalyst Handbook" ed Twig, 2nd edition, 1989, pp. (102–103).

*Primary Examiner*—Steven P. Griffin
*Assistant Examiner*—Maribel Medina

[57] ABSTRACT

A catalyst unit for use in an exothermic reaction, such as ammonia oxidation, comprises a material effective as a catalyst for said reaction having a shape conforming to a disc or cone having a plurality of radially extending corrugations. The catalyst unit may be disposed across a reactor with a start-up burner disposed above the catalyst unit and mounted for rotation about the axis of the reactor. The burner tube is pivoted and provided with means, for example a follower engaging with the upper surface of the catalyst unit, so that as the burner is rotated about the axis the burner tube pivots to maintain the burner tube a constant distance above the upper surface of the catalyst unit.

8 Claims, 2 Drawing Sheets

CATALYST

This invention relates to a catalyst and in particular to a catalyst for use in exothermic reactions, such as oxidation of ammonia.

The oxidation of ammonia is widely used in the production of nitric acid. The process is effected by passing a pre-heated ammonia/air mixture, typically containing 5–15, particularly 10–12% by volume of air, at a high linear velocity (measured at NTP) through a catalyst unit, e.g. a wad of precious metal meshes or gauzes of a precious metal such as platinum, often alloyed with rhodium, extending across the cross-section of the reactor. Alternatively the catalyst may be a cobalt oxide containing composition.

In order to avoid undesired side reactions, the contact time of the ammonia/air mixture and the catalyst is kept small, and so the catalyst is normally disposed as a relatively thin layer through which the reaction mixture is passed at high velocity. Linear gas velocities conventionally employed in commercial ammonia oxidation processes operating substantially at atmospheric pressure are usually in an excess of 2000 $Nm^3/h/m^2$, and typically are in the range 5000–10000 $Nm^3/h/m^2$, preferably 4000–6000 $Nm^3/h/m^2$. [Linear velocity is the volume of the gas mixture, expressed at NTP, in $m^3$ per hour per $m^2$ of the surface area of the catalyst bed]. In plants operating at higher pressures, e.g. up to 10 barg., the linear velocities are generally in the range 20000 to 50000 $Nm^3/h/m^2$. It is however desirable to maximise the amount of reaction that can take place within a reactor of given volume and to that end the cross sectional area of the catalyst layer is desirably maximised.

Since the pressure drop encountered by the gas mixture passing through a bed of catalyst is proportional to the inverse of the square of the surface area of the catalyst bed (see "Catalyst Handbook" ed Twig, 2nd edition, 1989, pages 102–103), an increase in the surface area can lead advantageously to a considerably decreased pressure drop.

In order to increase the effective surface area of the catalyst, it has been proposed in U.S. Pat. No. 5,401,483 to provide the catalyst layer in the form of nested gauzes or meshes having transverse corrugations. While that gives an increase in the surface area, it gives rise to a further problem.

Thus the reactants are typically fed to the reactor at a temperature in the range 190–200° C. but the reaction does not take place to any significant extent below about 250–300° C. Hence in order to start-up the reaction, it is necessary to heat the catalyst to a high temperature. However, once the reaction has commenced, it is self sustaining with the reaction temperature largely depending on the degree of pre-heating of the reactants, the space velocity and the relative proportions of the reactants. The heating of the catalyst to the temperature at which the reaction proceeds is normally achieved by directing a flame from a burner over the catalyst: the flame is generally provided by burning a suitable fuel, often hydrogen, as it emerges from perforations in a radially extending tube rotating about the axis of the reactor. In order to heat the catalyst evenly, it is desirable that the burner tube is maintained at a substantially constant distance above the catalyst surface. Clearly this is not possible where the catalyst layer has a transversely corrugated disposition as in the aforesaid U.S. Pat. No. 5,401,483.

We have devised an alternative construction.

Accordingly the present invention provides a catalyst unit for use in an exothermic reaction comprising a material effective as a catalyst for said reaction having a shape conforming to a disc or cone having a plurality of radially extending corrugations.

With such a radially corrugated configuration, if the burner tube is suitably pivoted, it can follow the corrugations as it is rotated about its axis. Thus a member depending from the burner tube to contact the catalyst unit, or a track conforming to the shape of the catalyst unit, can maintain the burner tube at a constant distance above the catalyst unit. Where the number of corrugations in the catalyst unit is an odd number, the peak of each corrugation is diametrically opposed to the trough of another corrugation so the burner tube can extend across the diameter of the catalyst unit and be pivoted at its centre for movement to follow the corrugations. On the other hand, where the number of corrugations is even, the burner tube should extend radially from the axis and be pivoted at the end about which it is rotated. Alternatively a burner tube can extend across the diameter of the catalyst unit but be split in the middle with each half being independently pivoted.

The invention thus also provides a reactor for an exothermic reaction having a generally circular cross-section with a vertical longitudinal axis and including a catalyst unit as described above disposed across the reactor, a start-up burner tube disposed above the catalyst unit, said burner tube being mounted for rotation about the longitudinal axis of the reactor and being pivoted at said axis for up and down movement, and means for moving said burner tube about said pivot whereby the burner tube is maintained at a distance substantially constant above the upper surface of the catalyst unit as said burner tube rotates about said longitudinal axis.

The invention is illustrated by the accompanying drawings wherein

Figure 1:
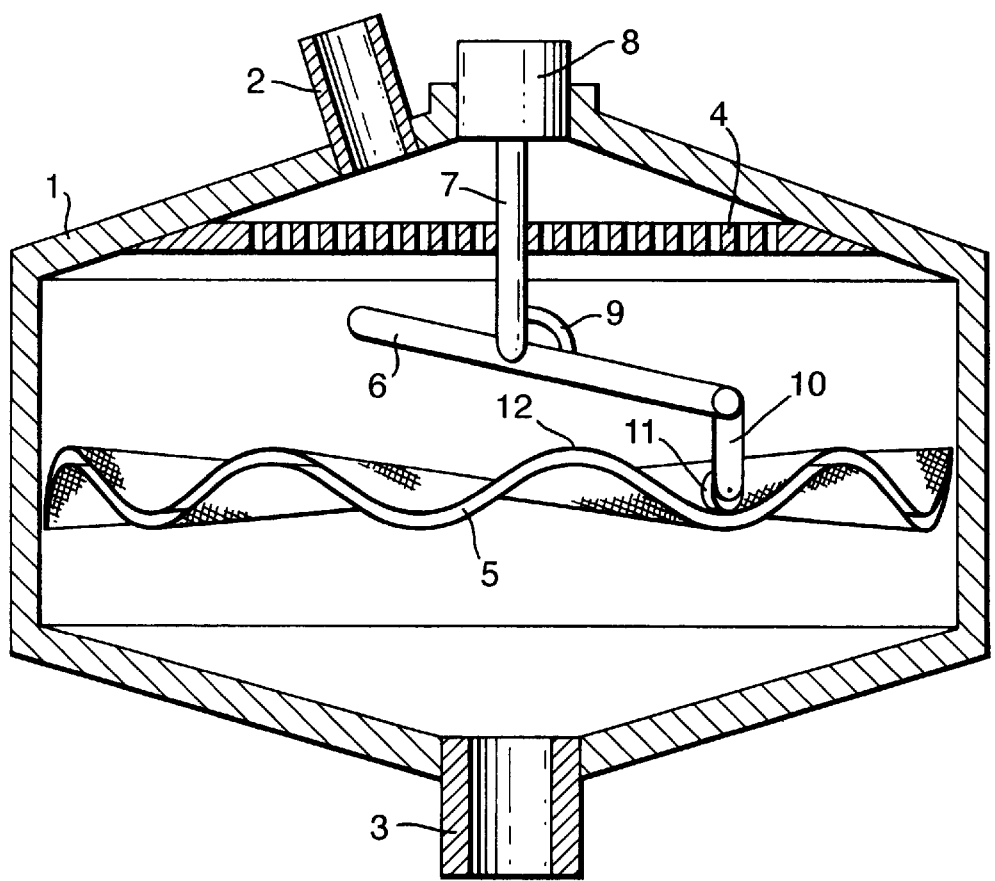
FIG. 1 is a diagrammatic sectional view of a catalytic reactor for an exothermic reaction.

In FIG. 1 there is shown a catalytic reactor, for example suitable for the oxidation of ammonia, having an outer shell 1 having a generally circular cross-section, typically having a diameter of 0.5–5 m, and provided at its upper end with a reactants inlet port 2 for supplying the reactants, e.g. a pre-heated mixture of ammonia and air, and at its lower end with a product outlet port 3. A perforated diffuser plate 4 is provided across the interior of the shell 1 below the reactants inlet port 2 to distribute the reactants uniformly over the cross-section of the interior of the shell 1. Disposed below the diffuser plate 4 and extending across the interior of the shell 1 is a catalyst unit 5 in the form of a pair of wire meshes held spaced apart (by means not shown) by about 1 to 5 cm. A catalyst in the form of small pellets of an oxidic composition comprising rare earth oxides and cobalt oxides is disposed in the space between the pair of meshes. Alternatively the catalyst unit may be a wad of wire gauzes of a suitable catalytically active metal, e.g. a platinum/rhodium alloy.

Disposed between the diffuser plate 4 and the catalyst unit 5 is a burner tube 6 attached to a shaft 7 which is rotatably driven by a motor 8 mounted on the top of the shell 1. Means (not shown) are provided to supply hydrogen to the interior of the shaft 7 and thence, via a flexible hose 9, to the interior of the burner tube 6. Burner tube 6 is pivotably mounted on shaft 7 so that it can pivot up and down and is also provided with burner orifices (not shown) at intervals along its length from which the hydrogen supplied to the burner can be burnt. At each end of the burner tube 6 is a burner tube follower in the form of a downward extending member 10 terminating in a roller 11 which engages with the upper surface 12 of the catalyst unit 5. Alternatively the burner tube follower may engage with a track formed on the interior wall of the shell. In another alternative the burner tube follower may be omitted and drive means provided to effect pivoting movement of the burner tube in synchronisation with the corrugations.

Figure 2:
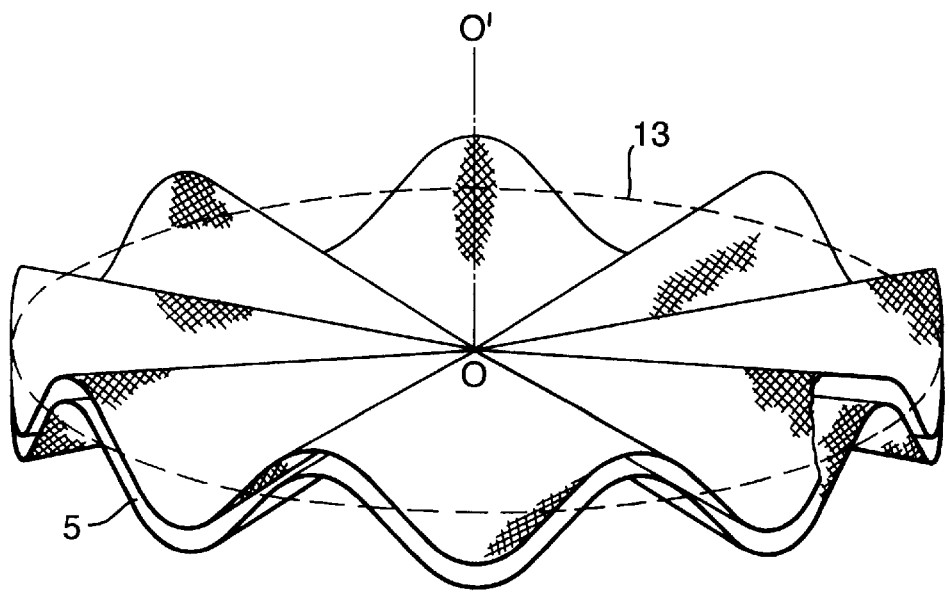
FIG. 2 is an isometric sketch of a catalyst unit having nine corrugations.

The catalyst unit 5 is generally in the form of a disc or cone having its periphery periodically displaced in relation to the centre of the disc or cone thus forming a number of radially extending corrugations. In FIG. 1, and as shown in FIG. 2, the unit 5 is in the form of a disc having nine radially extending corrugations: thus the periphery of the disc is periodically displaced above and below the plane perpendicular to the axis passing through the centre of the upper surface of the unit 5. In FIG. 2 the axis is designated by line O–O', while the plane perpendicular to that axis and passing through the centre, point O, of the upper surface of the unit is shown by the dotted line 13.

The shape of the catalyst unit can be considered to conform substantially to the figure described by the rotation of an elongated parallelogram about an axis co-linear with one of the shorter sides of the parallelogram with periodic variation, during said rotation, of (a) the angle between one of the longer sides of the parallelogram and said one of the shorter sides, and preferably also (b) the length of the longer sides of the parallelogram such that the projection of said figure on to the plane perpendicular to said axis is substantially a circle, the number of periodic variations during one rotation being an integer greater than one.

Figure 3:
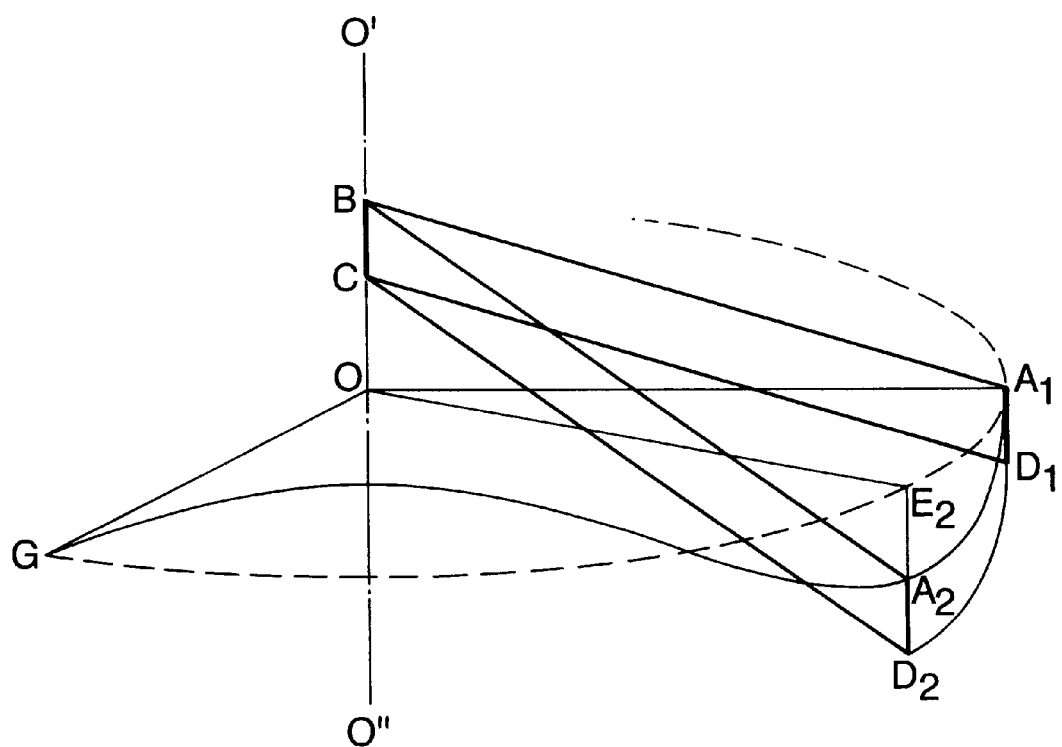
FIG. 3 is a diagrammatic isometric sketch of part of a catalyst unit showing its geometric derivation.

Referring to FIG. 3, a segment of a catalyst unit is shown. This segment corresponds to the solid shape formed by rotation of a parallelogram from an initial position $A_1BCD_1$, about an axis O'–O" co-linear with short side BC of the parallelogram through an angle $A_1OE_2$ to a position $A_2BCD_2$, where $A_1E_2$ (and G) are points on the circle in a plane perpendicular to axis O'–O" having its centre at point O on axis O'–O" and a radius of length $OA_1$, with the angle between one of the longer sides and one of the shorter sides of the parallelogram varying as the parallelogram is rotated. The length of the shorter side of the parallelogram corresponds to the thickness of the catalyst unit.

The angle between one of the longer sides and an adjacent shorter side, is initially angle $A_1BC$. At position $A_2BCD_2$ point $A_2$ is displaced below the corresponding point $E_2$ on the circle by a distance $A_2E_2$ so that the angle $A_2BC$ is less than angle $A_1BC$. Simple geometry shows that if the projection of the perimeter $A_1A_2$ of the segment on to the plane of the circle is to correspond to the arc $A_1E_2$, the length of the longer side $BA_2$ of the parallelogram at position $A_2BCD_2$ is greater than $BA_1$ and is given by $$BA_2{}^2 = (OB + E_2A_2)^2 + OE_2{}^2$$

Thus if the projection of the shape on to the plane perpendicular to said axis is to be a circle, the length of the longer sides of the parallelogram has to vary as the angle between one of the longer sides and one of the shorter sides of the parallelogram varies. In a preferred arrangement the variation of the amplitude (a) of the perimeter from the plane of the circle is sinusoidal, i.e.

$$a = r\, k\, \sin(N\theta)$$

where r is the radius of the circle, k is the ratio of the maximum amplitude of the displacement to r, θ is the angle of rotation and N is the number of periods of variation during one rotation.

Where the variation is sinusoidal, the surface area of the catalyst layer, is given by $$\frac{r}{2}\int \sqrt{(r^2 + (h - k\sin(N\theta))^2)\cdot(1 + (Nk\cos(N\theta))^2)}\cdot d\theta$$

for $\theta = 0$ to $\theta = 2\pi$ where h is the height of the cone, i.e. distance OB.

In one form of the invention, the shape of the catalyst unit conforms to a disc (as opposed to a cone) having a plurality of radially extending corrugations. Thus point B is co-incident with point O, i.e. h=0, so that at position $A_1BCD_1$ the parallelogram is a rectangle and the value of angle $A_1BC$ is 90°. If the variation of the displacement of the perimeter of the unit from the circle is sinusoidal, in this case, for the projection of the perimeter on to the plane perpendicular to the axis O'–O" to be a circle, the length (L) of the longer sides of the parallelogram has to vary in accordance with the equation $$L = r\sqrt{(1 + k^2\sin^2(N\theta))}$$

In FIG. 3, the perimeter of the upper edge of the unit over one period is shown by the line $A_1A_2G$: for a unit having three periods of variations of the angle between one of the longer sides and a shorter side of the parallelogram, angle $A_1BG$ is $2\pi/3$ radians, i.e. 120°.

Where points B and O are co-incident, provided the ratio of the maximum displacement to the radius of the aforementioned circle is small (for example k<0.2, particularly when k<0.1), it is seen that, for the projection to be circular, the variation in the value of L is small. As hereinafter described, in some cases it is possible to accommodate the projection of the perimeter on to the plane perpendicular to the axis of rotation departing from a circle as a result from the use of a catalyst unit having a shape corresponding to the rotation of a parallelogram about the axis without variation of the length of the longer sides of the parallelogram.

The variation of the angle between one of the longer sides and one of the shorter sides of the parallelogram is preferably, but not necessarily, sinusoidal. For example it may correspond, or approximate, to a triangular or saw-tooth wave.

The catalyst unit thus has a plurality of corrugations extending radially from the axis. The increase in surface area increases as the number of corrugations increase, and with the maximum displacement of the perimeter of the unit from the plane perpendicular to the axis of rotation and passing through the apexes of the corrugations at the perimeter. Where the corrugations are of sinusoidal form according to the equation $$a = r\, k\, \sin(N\theta)$$

as mentioned above, the maximum displacement is 2 r k. The maximum displacement from that plane is often in practice limited by space considerations, especially where it is intended that the catalyst unit be used as a replacement for a conventional catalyst cartridge, and typically will be less than 0.5 of the radius of the circle. Where a burner follower engaging with the upper surface of the catalyst unit or with a track on the interior wall of the reactor is employed, it is preferred that the maximum gradient (i.e. da/dθ) of the perimeter is less than 1. For sinusoidal variation of a catalyst unit where points B and O are co-incident as described above, the maximum gradient approximates to k×N. The following table sets out the approximate increase in surface area (over that of the circle) and the maximum gradient for sinusoidal variation of differing values of k and N.

| k | N | maximum gradient | area increase (%) |
|---|---|---|---|
| 0.00 | any | 0.0 | 0.0 |
| 0.025 | 20 | 0.5 | 6.0 |
| 0.025 | 40 | 1.0 | 21.6 |
| 0.05 | 10 | 0.5 | 6.0 |
| 0.05 | 20 | 1.0 | 21.7 |
| 0.10 | 5 | 0.5 | 6.2 |
| 0.10 | 10 | 1.0 | 21.9 |
| 0.25 | 2 | 0.5 | 7.6 |
| 0.25 | 4 | 1.0 | 23.3 |

It is seen that for any given ratio of the maximum displacement to the radius of the circle, to obtain the greatest increase in surface area, N, i.e. the number of corrugations, or periodic variations, should be as large as is consistent with the maximum permissible gradient. A 6% increase in surface area results in a decrease in the pressure drop of about 11%, while a 21% increase in the surface area results in a decrease in the pressure drop of about 32%.

As indicated above the catalyst unit may alternatively have a radially corrugated conical shape, i.e. distance OB, i.e. h, is not equal to zero. This can enable a greater surface area to be achieved. In one particular form, the corrugations are such that the peaks of the corrugations lie in the plane perpendicular to the axis of rotation and passing through the centre of the upper surface of the catalyst unit. In this case, h=k×r, and the parallelogram is a rectangle at the position corresponding to the peaks of the corrugations.

As mentioned above, it is preferred that the catalyst unit has a shape that corresponds to a circle when projected on to a plane perpendicular to the axis. This enables the full cross section of the reactor to be utilised. To obtain such a shape it is necessary that the catalyst unit corresponds to the figure obtained by the revolution of a parallelogram in which not only the angle of between adjacent sides varies, but also the length of the longer sides varies as the parallelogram is rotated. However, as indicated above, in some cases, where the maximum displacement of the perimeter of the unit is relatively small in relation to the radius of the unit, the discrepancy of the projection from a circle is small. By the provision of an inert packing between the periphery of the catalyst unit and the inner wall of the reactor, such a discrepancy may be accommodated. Alternatively, where the interior wall of the reactor is provided with a track with which a burner tube follower engages to effect the pivotal movement of the burner tube to maintain a substantially constant spacing of the burner tube above the corrugations of the catalyst unit, this track may have a varying width to accommodate the discrepancy from circular of the projection of the catalyst unit.

The catalyst units according to the invention may be formed in the convoluted corrugated shape, e.g. where the unit is knitted from wires or filaments of the catalytically active material. Alternatively the units may be assembled from a plurality of segments: by assembling the unit from a number N of flat segments each having an included angle greater than $2\pi/N$ radians, a corrugated structure can be obtained. The segments have the general shape of a sector of a circle, but, as indicated above, the perimeter may need to depart from an arc of a circle in order to accommodate the departure of the projection of the perimeter of the assembled unit from circular.

Where the catalyst is an oxidic composition, as opposed to precious metal meshes or gauzes, the catalyst particles may be irregular granules or may be moulded or formed into geometric shapes, such as cylinders. Preferred catalyst particles are moulded cylindrical tablets having a diameter in the range 0.5 to 4 mm and a length of 0.5 to 4 mm. The aspect ratio of the particles, i.e. the ratio of the maximum dimension to the minimum dimension, is preferably less than 2. Moulded particles, e.g. cylinders, may have one or more passages therethrough to increase the geometric surface area and to increase the bed voidage thereby reducing the pressure drop across the bed. The bed depth, is preferably 5 to 20 times the maximum dimension of the shaped particles.

For ammonia oxidation, oxidic catalysts preferably contain an oxidic composition containing cobalt. Preferably the oxidic composition comprises at least one mixed oxide phase containing cobalt and at least one element A selected from rare earths and yttrium. The element A to cobalt atomic ratio is preferably 0.8 to 1.2, particularly 1.0 to 1.2. Preferably at least one element selected from yttrium, cerium, lanthanum, neodymium, and praseodymium is used as part or all of element A. Element A may comprise a mixture of at least one variable valency element Vv selected from cerium and praseodymium and at least one non-variable valency element Vn selected from yttrium and the non-variable valency rare earth elements such as lanthanum or neodymium. In particular it is preferred that the atomic proportions of variable valency element Vv to non-variable valency element Vn is in the range 0 to 1, particularly 0 to 0.3.

We claim:

1. A catalyst unit for use in an exothermic reaction comprising a material effective as a catalyst for said reaction having a shape conforming to a disc or cone having a plurality of radially extending corrugations.

2. A catalyst unit according to claim 1 having a shape conforming substantially to the figure described by the rotation of an elongated parallelogram about an axis co-linear with one of the shorter sides of the parallelogram with periodic variation, during said rotation, of (a) the angle between one of the longer sides of the parallelogram and said one of the shorter sides, and preferably also (b) the length of the longer sides of the parallelogram such that the projection of said figure on to the plane perpendicular to said axis is substantially a circle.

3. A catalyst unit according to claim 2 wherein the periodic variation is sinusoidal.

4. A catalyst unit according to claim 2 wherein the maximum displacement of the perimeter of the unit from the plane perpendicular to the axis of rotation of the parallelogram and passing through the apexes of the corrugations at said perimeter, is less than 0.5 times the radius of the circle containing those apexes at the perimeter.

5. A reactor for an exothermic reaction having a generally circular cross-section with a vertical longitudinal axis and including a catalyst unit according to claim 1 disposed across the reactor, a start-up burner tube disposed above the catalyst unit, said burner tube being mounted for rotation about the longitudinal axis of the reactor and being pivoted at said axis for up and down movement, and means for moving said burner tube about said pivot whereby the burner tube is maintained at a distance substantially constant above the upper surface of the catalyst unit as said burner tube rotates about said longitudinal axis.

6. A reactor according to claim 5 wherein the catalyst unit has an odd number of corrugations and the burner tube extends across substantially the whole diameter of the catalyst unit.

7. A reactor according to claim 5 wherein the burner tube is provided with a follower member contacting the upper surface of the catalyst unit to maintain the burner tube at a distance substantially constant above the upper surface of the catalyst unit as the burner tube rotates about said longitudinal axis.

8. An ammonia oxidation process employing a reactor according to claim 5 wherein the catalyst unit is made from a mesh or gauzes of a platinum, optionally alloyed with rhodium, or a pair of metal meshes with particles of an oxidic composition containing cobalt disposed between said meshes.

* * * * *